(12) United States Patent
Papasotiriou et al.

(10) Patent No.: US 12,235,907 B1
(45) Date of Patent: Feb. 25, 2025

(54) METHOD AND SYSTEM FOR GENERATING KEYWORDS

(71) Applicant: JPMorgan Chase Bank, N.A., New York, NY (US)

(72) Inventors: Kassiani Papasotiriou, New York, NY (US); Tucker Richard Balch, Suwanee, GA (US); Srijan Sood, New York, NY (US); Shayleen Reynolds, New York, NY (US); Lawrence Yong, Harrison, NJ (US); Nilgun Ilayda Akalin, Lincoln Park, NJ (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/371,283

(22) Filed: Sep. 21, 2023

(30) Foreign Application Priority Data

Sep. 11, 2023 (GR) .............................. 20230100728

(51) Int. Cl.
*G06F 16/906* (2019.01)
*G06F 16/93* (2019.01)

(52) U.S. Cl.
CPC ............ *G06F 16/93* (2019.01); *G06F 16/906* (2019.01)

(58) Field of Classification Search
None
See application file for complete search history.

(56) References Cited

U.S. PATENT DOCUMENTS

| | | | | |
|---|---|---|---|---|
| 2009/0076797 A1* | 3/2009 | Yu | ............................ | G06F 16/58 |
| 2009/0234688 A1* | 9/2009 | Masuyama | ............ | G06F 16/353 |
| 2010/0312769 A1* | 12/2010 | Bailey | ................... | G06F 16/285 |
| | | | | 707/769 |
| 2018/0097763 A1* | 4/2018 | Garcia | ..................... | G06F 16/29 |
| 2019/0361843 A1* | 11/2019 | Stoddard | ............. | G06F 16/1834 |
| 2020/0272693 A1* | 8/2020 | Mody | ................... | G06F 16/345 |

* cited by examiner

*Primary Examiner* — Son T Hoang
(74) *Attorney, Agent, or Firm* — Greenblum & Bernstein, P.L.C.

(57) ABSTRACT

A method and system for generating keywords that distinguish a group of selected documents from a larger corpus. The method includes: receiving a corpus that includes a plurality of documents; selecting from the corpus, based on at least one predetermined criterion, a group of the documents; determining a first Inverse Document Frequency (IDF) score for each word in a vocabulary of the group with respect to the corpus; determining a second IDF score for each word in the vocabulary of the group with respect to the group; generating based on the first IDF score and the second IDF score, a Group Frequency Inverse Document Frequency (GFIDF) score for each word in the vocabulary of the group; and assigning based on the generated GFIDF score for each word in the vocabulary of the group, at least one keyword.

16 Claims, 4 Drawing Sheets

METHOD AND SYSTEM FOR GENERATING KEYWORDS

CROSS-REFERENCE TO RELATED APPLICATIONS

This application claims priority benefit from Greek application No. 20230100728, filed in the Greek Patent Office on Sep. 11, 2023, which is hereby incorporated by reference in its entirety.

BACKGROUND

1. Field of the Disclosure

This technology generally relates to methods and systems for generating keywords, and more particularly to methods and systems for generating keywords that distinguish a group of selected documents from a larger corpus.

2. Background Information

Topic discovery is a technique used in natural language processing that allows for the identification of key themes or topics present in a corpus of text. It enables the uncovering of patterns and relationships within unstructured data, making it easier for individuals to gain new insights and knowledge that may be difficult to find otherwise. By identifying the main themes within a text, this method aids in gaining a deeper understanding of the content.

One way to define a topic is by identifying a collection of words and phrases, also known as keywords, that are important to the document or to a collection of documents. The most widely-used techniques for extracting keywords follow a frequency-based approach. For example, the Bagof-Words (BoW) model extracts keywords by representing text as a bag of words, where each word is represented as a feature and its frequency is used to determine its importance. Another well-known method, Term Frequency-Inverse Document Frequency (TFIDF), calculates the importance of a word in a document by taking into account both how frequently it appears and how rare it is across all documents in the corpus.

However, keywords extracted by high frequency counts do not always form a coherent theme. Methods such as Latent Dirichlet Allocation (LDA) and Non-negative Matrix Factorization (NMF) identify keywords by taking into account the co-occurrence of words, which allows for the identification of latent topics within the text. LDA assumes that each text is made up of a mixture of topics, and each word is generated by one of those topics. It uses this information to identify the probability distribution of words within a topic and the probability distribution of topics within a text, thus discovering the underlying topics. NMF decomposes the document-term matrix, which represents the frequency of words in documents, into two lower-dimensional matrices, one representing the documents and the other representing the topics. These techniques can be used to extract semantically meaningful and coherent topics from a collection of documents, rather than just a list of frequently occurring words.

While both LDA and NMF are effective in discovering topics within a corpus of documents and assigning each document to a specific topic, they do not provide the ability for the user to define a specific group of documents and determine the common topic among them. Accordingly, there is a need for a new frequency-based statistic that addresses this limitation by providing a means of identifying the dominant topic within a specified group of documents that does not appear in the corpus of documents.

SUMMARY

The present disclosure, through one or more of its various aspects, embodiments, and/or specific features or sub-components, provides, inter alia, various systems, servers, devices, methods, media, programs, and platforms for identifying terms or keywords in a group of selected documents that distinguish them from a larger corpus.

According to an aspect of the present disclosure, a method for generating keywords is provided. The method is implemented by at least one processor. The method includes: receiving, by the at least one processor, a corpus that includes a plurality of documents: selecting by the at least one processor from the corpus, based on at least one predetermined criterion, a group of the plurality of documents: determining, by the at least one processor, a first Inverse Document Frequency (IDF) score for each word in a vocabulary of the group with respect to the corpus: determining, by the at least one processor, a second IDF score for each word in the vocabulary of the group with respect to the group: generating, by the at least one processor based on the first IDF score and the second IDF score, a Group Frequency Inverse Document Frequency (GFIDF) score for each word in the vocabulary of the group; and assigning, by the at least one processor based on the generated GFIDF score for each word in the vocabulary of the group, at least one keyword.

The generating of the GFIDF score may include dividing the first IDF score by the second IDF score.

The assigning of the at least one keyword may include selecting at least one word from the vocabulary of the group having a GFIDF score higher than other words in the vocabulary of the group.

The method may further include displaying, via a graphical user interface (GUI), a result of the assigning of the at least one keyword.

The corpus may include a first number of the plurality of documents, and the group may include a second number of the plurality of documents selected from the corpus. The determining of the first IDF score for each respective word may include first calculating a first quotient by dividing the first number by a number of documents in the corpus containing the respective word, and then taking a logarithm of the first quotient. The determining of the second IDF score for each respective word may include first calculating a second quotient by dividing the second number by a number of documents in the group containing the respective word, and then taking a logarithm of the second quotient.

The assigning of the at least one keyword may be further based on a determination that the GFIDF score exceeds a predetermined threshold.

The method may further include generating a theme for the group that is a collection of the at least one keyword.

The method may further include where each respective one of the plurality of documents included in the corpus includes a description of a respective company, and the at least one keyword identifies a theme among companies within the group based on descriptions included within the selected group.

The method may further include where each of the assigned keywords is ranked with respect to importance based on the generated GFIDF score, with the keywords having higher generated GFIDF scores being ranked as more important.

According to another aspect of the present disclosure, a computing apparatus for generating keywords is provided. The computing apparatus includes a processor; a memory; a display; and a communication interface coupled to each of the processor, the memory, and the display. The processor is configured to: receive, via the communication interface, a corpus that includes a plurality of documents: select, from the corpus, based on at least one predetermined criterion, a group of the plurality of documents: determine a first Inverse Document Frequency (IDF) score for each word in a vocabulary of the group with respect to the corpus: determine a second IDF score for each word in the vocabulary of the group with respect to the group: generate, based on the first IDF score and the second IDF score, a Group Frequency Inverse Document Frequency (GFIDF) score for each word in the vocabulary of the group; and assign, based on the generated GFIDF score for each word in the vocabulary of the group, at least one keyword.

The generating of the GFIDF score may include dividing the first IDF score by the second IDF score.

The assigning of the at least one keyword may include selecting at least one word from the vocabulary of the group having a GFIDF score higher than other words in the vocabulary of the group.

The processor may be further configured to cause the display to display, via a graphical user interface (GUI), a result of the assigning of the at least one keyword.

The corpus may include a first number of the plurality of documents, and the group may include a second number of the plurality of documents selected from the corpus. The determining of the first IDF score for each respective word may include first calculating a first quotient by dividing the first number by a number of documents in the corpus containing the respective word, and then taking a logarithm of the first quotient. The determining of the second IDF score for each respective word may include first calculating a second quotient by dividing the second number by a number of documents in the group containing the respective word, and then taking a logarithm of the second quotient.

The assigning of the at least one keyword may be further based on a determination that the GFIDF score exceeds a predetermined threshold.

The processor may be further configured to generate a theme for the group that is a collection of the at least one keyword.

Each respective one of the plurality of documents included in the corpus may include a description of a respective company, and the at least one keyword may identify a theme among companies within the group based on descriptions included within the selected group.

The processor may be further configured to cause each of the assigned keywords to be ranked with respect to importance based on the generated GFIDF score, with the keywords having higher generated GFIDF scores being ranked as more important.

According to yet another aspect of the present disclosure, a non-transitory computer readable storage medium storing instructions for generating keywords is provided. The storage medium includes executable code which, when executed by a processor, causes the processor to: receive, via the communication interface, a corpus that includes a plurality of documents: select, from the corpus, based on at least one predetermined criterion, a group of the plurality of documents; determine a first Inverse Document Frequency (IDF) score for each word in a vocabulary of the group with respect to the corpus; determine a second IDF score for each word in the vocabulary of the group with respect to the group: generate, based on the first IDF score and the second IDF score, a Group Frequency Inverse Document Frequency (GFIDF) score for each word in the vocabulary of the group; and assign, based on the generated GFIDF score, at least one keyword.

When executed by the processor, the executable code, when generating the GFIDF, may further include dividing the first IDF score by the second IDF score.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
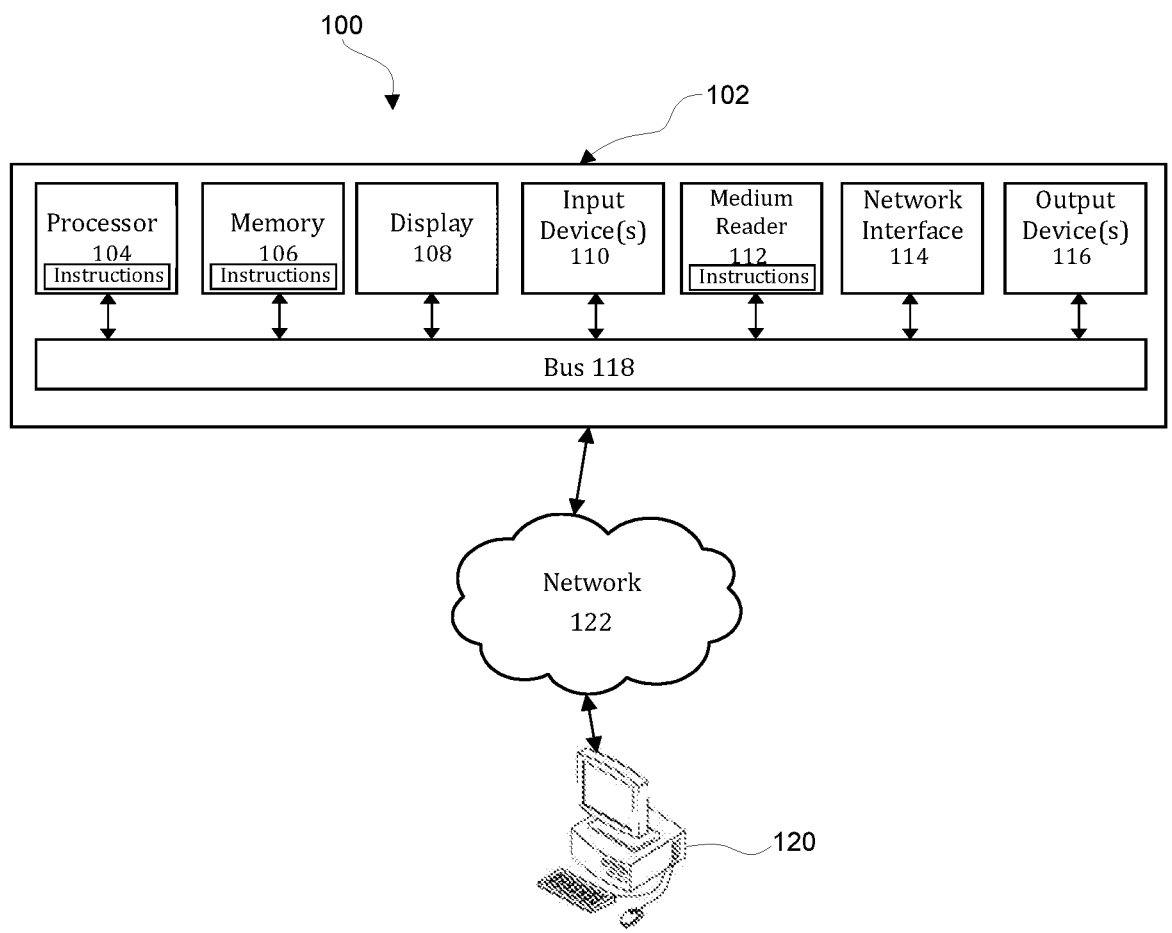
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for generating keywords that distinguish a group of selected documents from a larger corpus.

In accordance with various embodiments of the disclosure, the method works by identifying terms that frequently appear within the selected group but infrequently in the overall corpus. The resulting terms describe the topic of the group. The method builds upon the well-known method Term Frequency-Inverse Document Frequency (TFIDF). TFIDF is a statistical measure that assigns a numerical value to each word in a vocabulary to indicate the importance of the word in a selected document in distinguishing it from other documents in a larger corpus. By using the values assigned to each word, keywords that are important to the document relative to the corpus can be identified. The term frequency (TF) of a word in a selected document is the number of times the word appears in the document divided by the total number of words in the document.

TF may be expressed as follows:

$$TF(t, d) = \frac{f_{t,d}}{\sum_{t' \in d} f_{t',d}}, \quad (1)$$

where d is the selected document that is part of the overall corpus of documents D. t is a word in d and $f_{t,d}$ is the raw count of t in d.

The inverse document frequency (IDF) of a word is a measure of how rare the word is across the corpus D (i.e., a collection of documents).

IDF may be expressed as follows:

$$IDF(t, D) = \log \frac{|D|}{|d \in D : t \in d| + 1}, \quad (2)$$

where t is a word in the vocabulary, D are the documents in the corpus, and $|d \in D: t \in d|$ is the number of documents in which the term t appears. It is common to add 1 to the denominator to avoid division by 0.

Therefore, TF-IDF score of a word t in a document d within a corpus D is calculated by:

$$TFIDF(t,d,D)=TF(t,d)*IDF(t,D) \quad (3)$$

TFIDF assigns a value to each word in a document. A higher weight indicates that the word appears frequently in the selected document and not commonly across the entire collection of documents. This approach helps filter out common terms.

TFIDF works well for identifying words that distinguish a single document from a larger corpus, but it does not directly extend to the problem of finding keywords for a set of documents. A naive approach to finding keywords that describe a group of documents might be to concatenate all the documents in the group and then use TFIDF to identify keywords in the resulting document. However, the concatenation approach does not ensure that the identified terms accurately reflect the topic or theme of the group as a whole. For example, a rare term, in the context of the corpus, that appears frequently in one document within the group might be incorrectly identified as a keyword, even though it is not relevant to the other documents in the group.

As described herein, various embodiments provide optimized methods and systems for generating keywords that distinguish a group of selected documents from a larger corpus.

Figure 2:
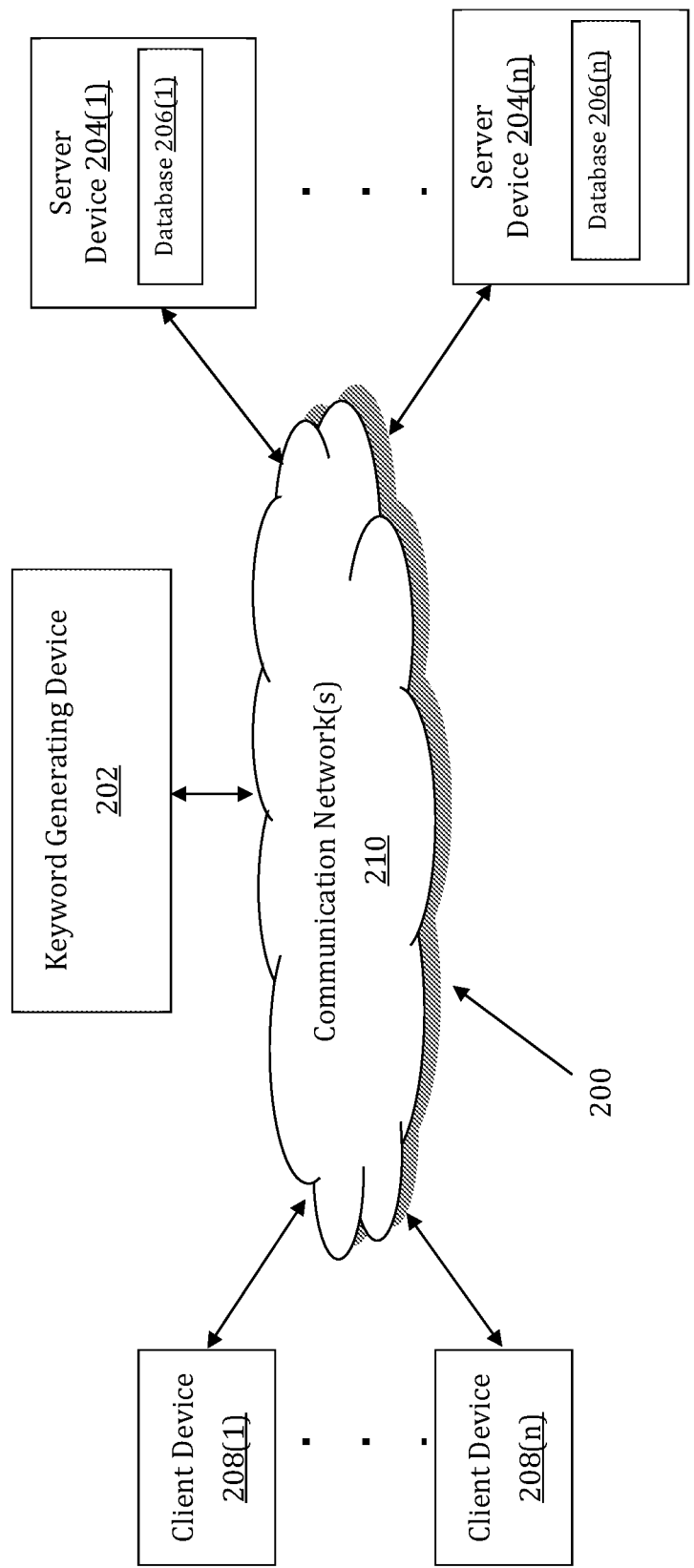
FIG. 2 illustrates an exemplary diagram of a network environment.

Referring to FIG. 2, a schematic of an exemplary network environment 200 for implementing a method for generating keywords that distinguish a group of selected documents from a larger corpus is illustrated. In an exemplary embodiment, the method is executable on any networked computer platform, such as, for example, a personal computer (PC).

The method for generating keywords that distinguish a group of selected documents from a larger corpus may be implemented by a keyword generating device 202. The keyword generating device 202 may be the same or similar to the computer system 102 as described with respect to FIG. 1. The keyword generating device 202 may store one or more applications that can include executable instructions that, when executed by the keyword generating device 202, cause the keyword generating device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the keyword generating device 202 itself, may be located in virtual server(s) running in a cloud-based computing environment rather than being tied to one or more specific physical network computing devices. Also, the application(s) may be running in one or more virtual machines (VMs) executing on the keyword generating device 202. Additionally, in one or more embodiments of this technology, virtual machine(s) running on the keyword generating device 202 may be managed or supervised by a hypervisor.

In the network environment 200 of FIG. 2, the keyword generating device 202 is coupled to a plurality of server devices 204(1)-204(n) that hosts a plurality of databases 206(1)-206(n), and also to a plurality of client devices 208(1)-208(n) via communication network(s) 210. A communication interface of the keyword generating device 202, such as the network interface 114 of the computer system 102 of FIG. 1, operatively couples and communicates between the keyword generating device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the keyword generating device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and keyword generating devices that efficiently implement a method for generating keywords that distinguish a group of selected documents from a larger corpus.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The keyword generating device 202 may be a standalone device or integrated with one or more other devices or apparatuses, such as one or more of the server devices 204(1)-204 (n), for example. In one particular example, the keyword generating device 202 may include or be hosted by one of the server devices 204(1)-204(n), and other arrangements are also possible. Moreover, one or more of the devices of the keyword generating device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the keyword generating device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store data that relates to a corpus of documents and group selection criteria.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the keyword generating device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the keyword generating device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the keyword generating device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the keyword generating device 202, the server devices 204(1)-204(n), or the client devices 208(1)-208(n), for example, may be configured to operate as virtual instances on the same physical machine. In other words, one or more of the keyword generating device 202, the server devices 204(1)-204(n), or the client devices 208(1)-208(n) may operate on the same physical device rather than as separate devices communicating through communication network(s) 210. Additionally, there may be more or fewer keyword generating devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
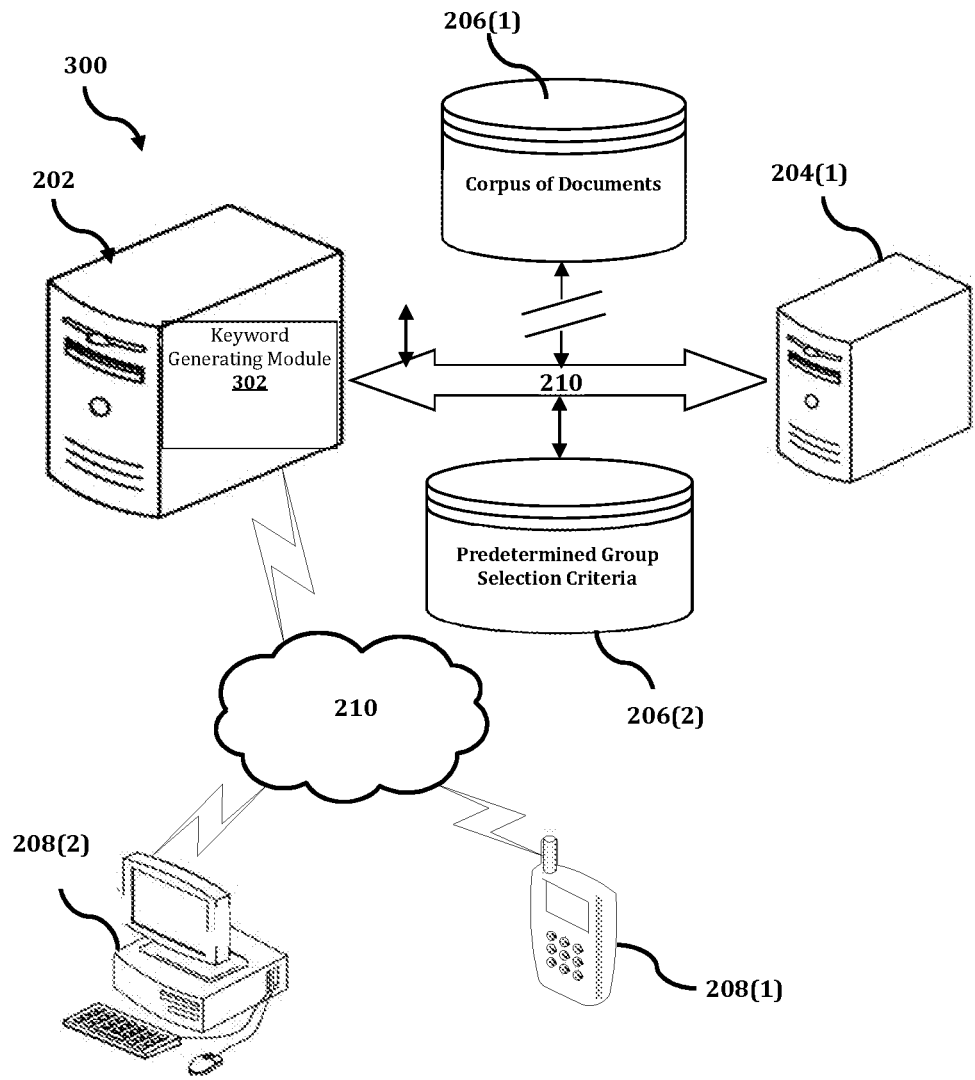
FIG. 3 shows an exemplary system for implementing a method for generating keywords that distinguish a group of selected documents from a larger corpus.

The keyword generating device 202 is described and illustrated in FIG. 3 as including a keyword generating module 302, although it may include other rules, policies, modules, databases, or applications, for example. As will be described below, the keyword generating module 302 is configured to implement a method for generating keywords that distinguish a group of selected documents from a larger corpus.

An exemplary process 300 for generating keywords that distinguish a group of selected documents from a larger corpus by utilizing the network environment of FIG. 2 is illustrated as being executed in FIG. 3. Specifically, a first client device 208(1) and a second client device 208(2) are illustrated as being in communication with keyword generating device 202. In this regard, the first client device 208(1) and the second client device 208(2) may be "clients" of the keyword generating device 202 and are described herein as such. Nevertheless, it is to be known and understood that the first client device 208(1) and/or the second client device 208(2) need not necessarily be "clients" of the keyword generating device 202, or any entity described in association therewith herein. Any additional or alternative relationship may exist between either or both of the first client device 208(1) and the second client device 208(2) and the keyword generating device 202, or no relationship may exist.

Further, keyword generating device 202 is illustrated as being able to access a corpus of documents 206(1) and a predetermined group selection criteria 206(2). The keyword generating module 302 may be configured to access these databases for implementing a method for generating keywords that distinguish a group of selected documents from a larger corpus.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the keyword generating device 202 via broadband or cellular communication. Of course, these embodiments are merely exemplary and are not limiting or exhaustive.

Upon being started, the keyword generating module 302 executes a process for generating keywords that distinguish a group of selected documents from a larger corpus. An exemplary process for generating keywords that distinguish a group of selected documents from a larger corpus is generally indicated at flowchart 400 in FIG. 4.

Figure 4:
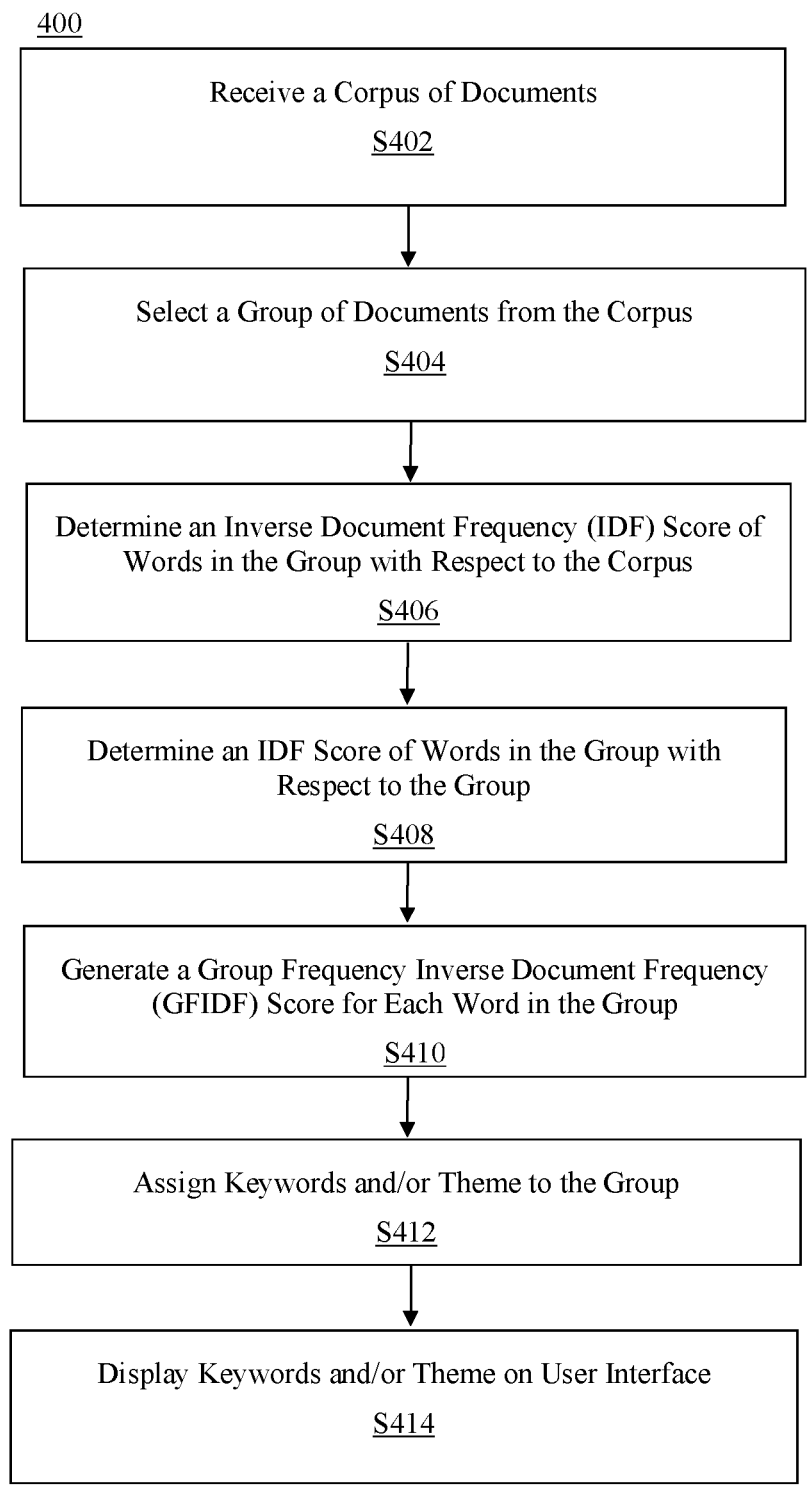
FIG. 4 is a flowchart of an exemplary process for implementing a method for generating key words that distinguish a group of selected documents from a larger corpus.

In process 400 of FIG. 4, at step S402, the keyword generating module 302 receives a corpus of documents. In an exemplary embodiment, the corpus includes a large variety of documents covering a diverse range of topics, themes, and/or subjects. In an exemplary embodiment, each document from the corpus of documents may include a description of a company.

At step S404, the keyword generating module 302 selects a group of documents from the corpus of documents. In an exemplary embodiment, the group may be selected from the corpus based on predetermined criteria. In an exemplary embodiment, the selection may be based on user defined preferences. In an exemplary embodiment, a user may select specific companies from the corpus to comprise a group.

At step S406 the keyword generating module 302 determines an IDF score for each word in the vocabulary of the group of documents with respect to the entire corpus ($IDF_{corpus}$). In an exemplary embodiment, determining the $IDF_{corpus}$ includes first calculating a first quotient by dividing the number of documents in the corpus by a number of documents in the corpus containing the word, and then taking a logarithm of the first quotient.

Based on the above, the determining of $IDF_{corpus}$ may be expressed as follows:

$$IDF_{corpus}(t \in V_G, D) = \log \frac{|D|}{|d \in D : t \in d| + 1}, \quad (4)$$

where t is a word, D is the corpus documents and G is the group of documents. The word t is part of the vocabulary $V_G$ which contains all the unique words that appear across all documents in G. $|d \in D: t \in d|$ is the number of documents in D in which the term t appears.

Then, at step S408, the keyword generating module 302 determines an IDF score for each word in the vocabulary of the group of documents with respect to the group ($IDF_{group}$). In an exemplary embodiment, determining the $IDF_{group}$ includes first calculating a first quotient by dividing the number of documents in the group by a number of documents in the group containing the word, and then taking a logarithm of the first quotient.

Based on the above, the determining of the $IDF_{group}$ may be expressed as follows:

$$IDF_{group}(t \in V_G, G) = \log \frac{|G|}{|g \in G : t \in g| + 1}, \quad (5)$$

where t is a word, and G is the group of documents. The word t is part of the vocabulary $V_G$ which contains all the unique words that appear across all documents in G. |g∈G: t∈g| is the number of documents in G in which the term t appears.

At step S410, the keyword generating module 302 generates a Group Frequency Inverse Document Frequency (GFIDF) score for each word in the group. In an exemplary embodiment, determining the GFIDF score includes dividing the $IDF_{corpus}$ score by the IDF group score.

Based on the above, the determining of an GFIDF score for each word in the group may be expressed as follows:

$$GFIDF(t \in V_G, G, D) = \frac{IDF_{corpus}}{IDF_{group}} \quad (6)$$

At step S412, the keyword generating module 302 assigns keywords to the group based on the determined GFIDF scores. In an exemplary embodiment, keywords are selected to have a high $IDF_{corpus}$ score, which means that the keywords do not appear often in many documents among the corpus, and a low $IDF_{group}$, which means that these words appear in many documents among the group. In an exemplary embodiment, the keywords are selected among the words having the highest GFIDF scores. In an exemplary embodiment, the keywords are selected among the vocabulary of words in which the GFIDF score exceeds a predetermined threshold. In an exemplary embodiment, the keyword generating module 302 may generate a theme for the group of documents. In an exemplary embodiment, the theme may be a collection of the selected keywords. In an exemplary embodiment, the highest scoring words, based on GFIDF score, can be treated as keywords to describe the theme of the selected group of documents that distinguish them from the overall corpus.

At step S414, the keyword generating module 302 displays, via the GUI, a result of the assigned keywords and or generated theme describing the selected group of documents that distinguish them from the overall corpus.

In an exemplary embodiment, the keyword generating module 302 may be used to analyze the performance of top companies in an index of companies during a specified time period. For example, the keyword generating module 302 may first receive a description of each company in the index (i.e., corpus). The user may then select a group of companies, from the index, that had highly correlated daily returns, over a predetermined period of time. Next, the keyword generating module 302 may then compute the GFIDF score for each word in the selected group's vocabulary and sort them in descending order. Finally, in an exemplary embodiment, the keyword generating module 302 assigns the top twelve keywords that best describe the common theme among the group of companies.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for generating keywords, the method comprising:
   receiving, by the at least one processor, a corpus that includes a plurality of documents that describe a plurality of entities, wherein each respective one of the plurality of documents included in the corpus includes a description of a respective company;
   selecting, by the at least one processor from the corpus, based on at least one predetermined criterion, a group of the plurality of documents, wherein the predetermined criterion relates to a correlation between a group of entities from the plurality of entities, and wherein the group of entities is described in the selected group of the plurality of documents;
   determining, by the at least one processor, a first Inverse Document Frequency (IDF) score for each word in a vocabulary of the group of the plurality of documents with respect to the corpus;
   determining, by the at least one processor, a second IDF score for each word in the vocabulary with respect to the group of the plurality of documents;
   generating, by the at least one processor based on the first IDF score and the second IDF score, a Group Frequency Inverse Document Frequency (GFIDF) score for each word in the vocabulary;
   assigning, by the at least one processor based on the generated GFIDF score for each word in the vocabulary, at least one keyword that describes the group of entities; and
   displaying the at least one keyword via a graphical user interface (GUI), wherein the at least one keyword identifies a theme among companies within the group of the plurality of documents based on the respective descriptions, and the at least one keyword distinguishes companies within the group from the respective companies in the corpus.

2. The method of claim 1, wherein the generating of the GFIDF score comprises dividing the first IDF score by the second IDF score.

3. The method of claim 1, wherein the assigning of the at least one keyword comprises selecting at least one word from the vocabulary having a GFIDF score higher than other words in the vocabulary.

4. The method of claim 1, wherein the corpus includes a first number of the plurality of documents, and the group of the plurality of documents includes a second number of the plurality of documents selected from the corpus,
   the determining of the first IDF score for each respective word comprises first calculating a first quotient by dividing the first number by a number of documents in the corpus containing the respective word, and then taking a logarithm of the first quotient, and
   the determining of the second IDF score for each respective word comprises first calculating a second quotient by dividing the second number by a number of documents in the group of the plurality of documents containing the respective word, and then taking a logarithm of the second quotient.

5. The method of claim 1, wherein the assigning of the at least one keyword is further based on a determination that the GFIDF score exceeds a predetermined threshold.

6. The method of claim 1, further comprising generating a theme for the group of the plurality of documents that is a collection of the at least one keyword that describes a commonality between the group of entities.

7. The method of claim 1, wherein each of the at least one keyword is ranked with respect to importance based on the generated GFIDF score, with keywords having higher generated GFIDF scores being ranked as more important.

8. A computing apparatus for generating keywords, the computing apparatus comprising:
   a processor;
   a memory;
   a display; and
   a communication interface coupled to each of the processor, the memory, and the display, wherein the processor is configured to:
      receive, via the communication interface, a corpus that includes a plurality of documents that describe a plurality of entities, wherein each respective one of the plurality of documents included in the corpus includes a description of a respective company;
      select, from the corpus, based on at least one predetermined criterion, a group of the plurality of documents, wherein the predetermined criterion relates to a correlation between a group of entities from the plurality of entities, and wherein the group of entities is described in the group of the plurality of documents;
      determine a first Inverse Document Frequency (IDF) score for each word in a vocabulary of the plurality of documents with respect to the corpus;

determine a second IDF score for each word in the vocabulary with respect to the group of the plurality of documents;

generate, based on the first IDF score and the second IDF score, a Group Frequency Inverse Document Frequency (GFIDF) score for each word in the vocabulary; and assign, based on the generated GFIDF score for each word in the vocabulary, at least one keyword that describes the group of entities; and display the at least one keyword via a graphical user interface (GUI) of the display, wherein the at least one keyword identifies a theme among companies within the group of the plurality of documents based on the respective descriptions, and the at least one keyword distinguishes companies within the group from the respective companies in the corpus.

9. The computing apparatus of claim 8, wherein the generating of the GFIDF score comprises dividing the first IDF score by the second IDF score.

10. The computing apparatus of claim 8, wherein the assigning of the at least one keyword comprises selecting at least one word from the vocabulary having a GFIDF score higher than other words in the vocabulary.

11. The computing apparatus of claim 8, wherein the corpus includes a first number of the plurality of documents, and the group of the plurality of documents includes a second number of the plurality of documents selected from the corpus, the determining of the first IDF score for each respective word comprises first calculating a first quotient by dividing the first number by a number of documents in the corpus containing the respective word, and then taking a logarithm of the first quotient, and the determining of the second IDF score for each respective word comprises first calculating a second quotient by dividing the second number by a number of documents in the group of the plurality of documents containing the respective word, and then taking a logarithm of the second quotient.

12. The computing apparatus of claim 8, wherein the assigning of the at least one keyword is further based on a determination that the GFIDF score exceeds a predetermined threshold.

13. The computing apparatus of claim 8, wherein the processor is further configured to generate a theme for the group of the plurality of documents that is a collection of the at least one keyword that describes a commonality between the group of entities.

14. The computing apparatus of claim 8, wherein each of the at least one keyword is ranked with respect to importance based on the generated GFIDF score, with the keywords having higher generated GFIDF scores being ranked as more important.

15. A non-transitory computer readable storage medium storing instructions for generating keywords, the storage medium comprising executable code which, when executed by a processor, causes the processor to:

receive, via the communication interface, a corpus that includes a plurality of documents that describe a plurality of entities, wherein each respective one of the plurality of documents included in the corpus includes a description of a respective company;

select, from the corpus, based on at least one predetermined criterion, a group of the plurality of documents, wherein the predetermined criterion relates to a correlation between a group of entities from the plurality of entities, and wherein the group of entities is described in the group of the plurality of documents;

determine a first Inverse Document Frequency (IDF) score for each word in a vocabulary of the plurality of documents with respect to the corpus;

determine a second IDF score for each word in the vocabulary with respect to the group of the plurality of documents;

generate, based on the first IDF score and the second IDF score, a Group Frequency Inverse Document Frequency (GFIDF) score for each word in the vocabulary;

assign, based on the generated GFIDF score for each word in the vocabulary, at least one keyword that describes the group of entities; and display the at least one keyword via a graphical user interface (GUI), wherein the at least one keyword identifies a theme among companies within the group of the plurality of documents based on the respective descriptions, and the at least one keyword distinguishes companies within the group from the respective companies in the corpus.

16. The storage medium of claim 15, wherein the generating of the GFIDF score comprises dividing the first IDF score by the second IDF score.

* * * * *